(12) United States Patent
Sensui

(10) Patent No.: US 6,490,101 B2
(45) Date of Patent: Dec. 3, 2002

(54) WIDE-ANGLE LENS SYSTEM

(75) Inventor: Takayuki Sensui, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 22 days.

(21) Appl. No.: 09/732,750

(22) Filed: Dec. 11, 2000

(65) Prior Publication Data

US 2001/0007512 A1 Jul. 12, 2001

(30) Foreign Application Priority Data

Dec. 14, 1999 (JP) .......................... 11-354772

(51) Int. Cl.$^7$ ............................... G02B 13/04
(52) U.S. Cl. ................................. 359/749
(58) Field of Search ................ 359/749–753, 359/754–756, 761, 763, 770–771, 781–784, 793, 680–682

(56) References Cited

U.S. PATENT DOCUMENTS

| | | | |
|---|---|---|---|
| 4,257,678 A | 3/1981 | Momiyama et al. | 359/753 |
| 4,449,793 A | 5/1984 | Nakamura et al. | 359/749 |
| 5,477,389 A | 12/1995 | Ito et al. | 359/752 |
| 5,805,359 A | 9/1998 | Yamanashi | 359/753 |
| 6,359,738 B1 * | 3/2002 | Nakamura et al. | 359/691 |

FOREIGN PATENT DOCUMENTS

| | | |
|---|---|---|
| JP | 55147607 | 11/1980 |
| JP | 57-35821 | 2/1982 |
| JP | 58202414 | 11/1983 |

* cited by examiner

*Primary Examiner*—Jordan M. Schwartz
(74) *Attorney, Agent, or Firm*—Greenblum & Bernstein, P.L.C.

(57) ABSTRACT

A wide-angle lens system includes a negative first lens group and a positive second lens group with a diaphragm, in this order from an object. Upon focusing, the positive second lens group is arranged to be moved along the optical axis. The wide-angle lens system satisfies the following conditions:

$$0.5 < TL2/f < 1.0 \quad (1)$$

$$4 < f1/f2 < -2 \quad (2)$$

wherein
  TL2 designates the distance, in the second lens group, between the most object-side surface of the most object-side lens element and the most image-side surface of the most image-side lens element;
  f designates the focal length of the entire lens system when an object at an infinite distance is in an in-focus state;
  f1 designates the focal length of the first lens group; and
  f2 designates the focal length of the second lens group.

7 Claims, 8 Drawing Sheets

Fno=3.6 y=34.85 y=34.85 y=34.85

—— d Line
------ g Line
---- C Line

— S
-- M

-0.5    0.5
SPHERICAL
ABERRATION
CHROMATIC
ABERRATION

-0.05   0.05
LATERAL
CHROMATIC
ABERRATION

-0.5    0.5
ASTIGMATISM

-3 (%) 3
DISTORTION

Fig.3A
Fno=3.65
Fig.3B
y=34.85
Fig.3C
y=34.85
Fig.3D
y=34.85
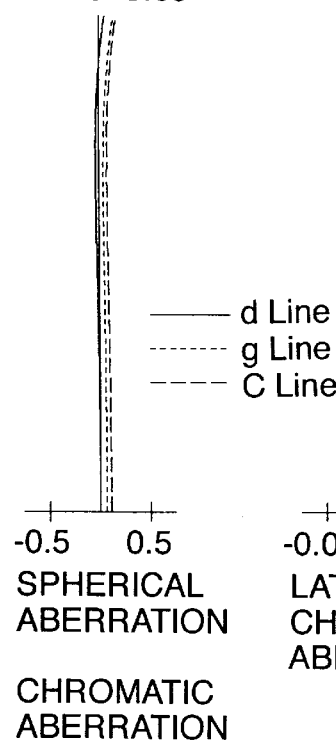
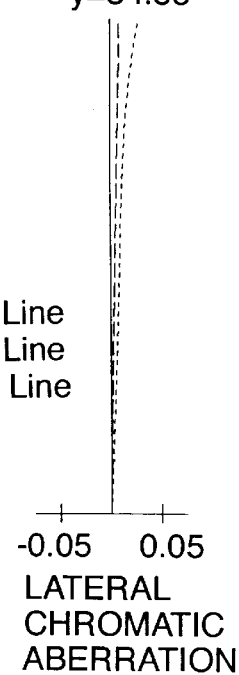
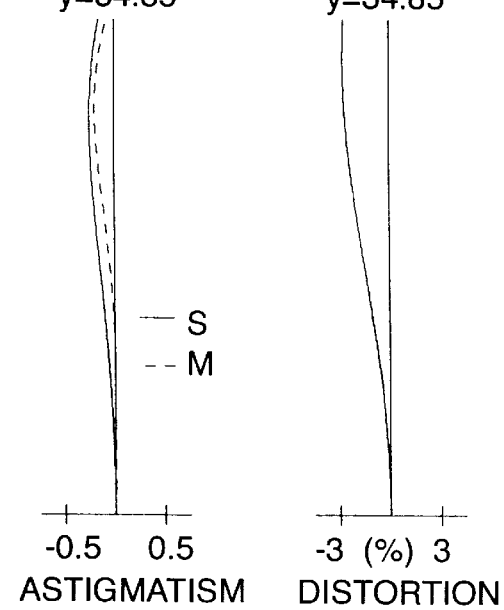
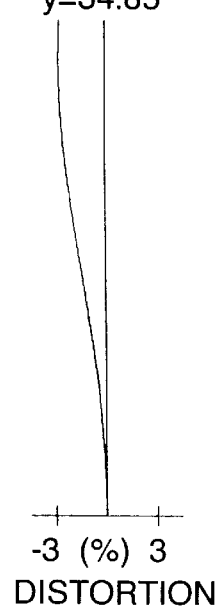
-0.5  0.5
SPHERICAL
ABERRATION
CHROMATIC
ABERRATION
-0.05  0.05
LATERAL
CHROMATIC
ABERRATION
-0.5  0.5
ASTIGMATISM
-3 (%) 3
DISTORTION
Fig.4A
Fno=4.0
Fig.4B
y=34.85
Fig.4C
y=34.85
Fig.4D
y=34.85
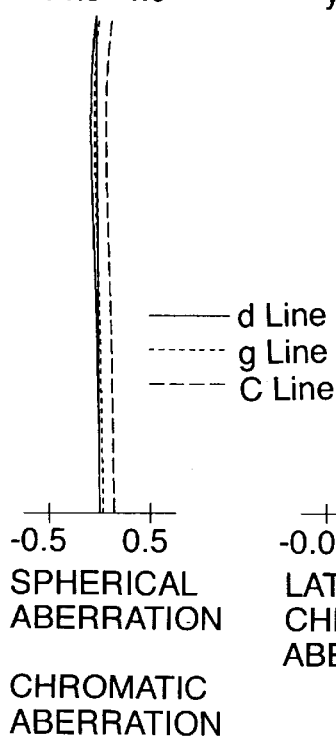
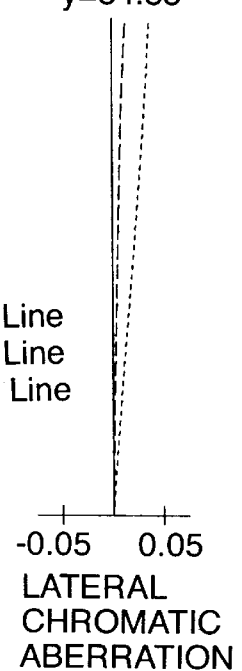
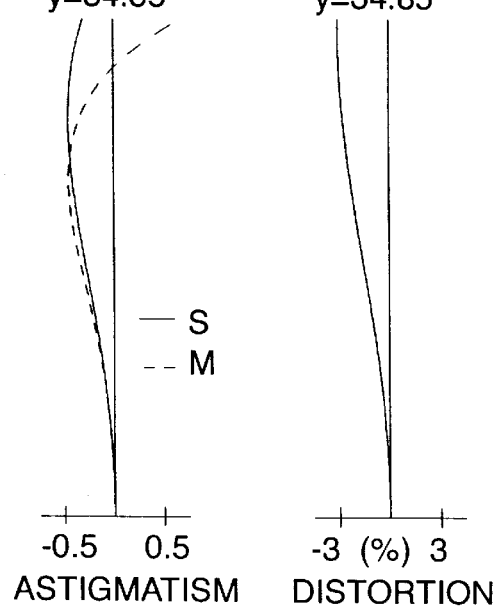
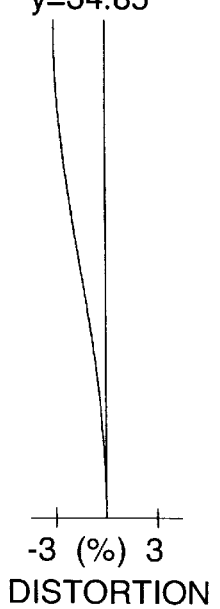
-0.5  0.5
SPHERICAL
ABERRATION
CHROMATIC
ABERRATION
-0.05  0.05
LATERAL
CHROMATIC
ABERRATION
-0.5  0.5
ASTIGMATISM
-3 (%) 3
DISTORTION Fno=3.6 y=34.85 y=34.85 y=34.85

——— d Line
------- g Line
— — — C Line

——— S
- - - M

-0.5    0.5
SPHERICAL
ABERRATION

CHROMATIC
ABERRATION

-0.05    0.05
LATERAL
CHROMATIC
ABERRATION

-0.5    0.5
ASTIGMATISM

-3 (%) 3
DISTORTION

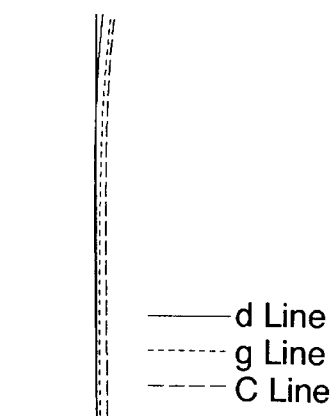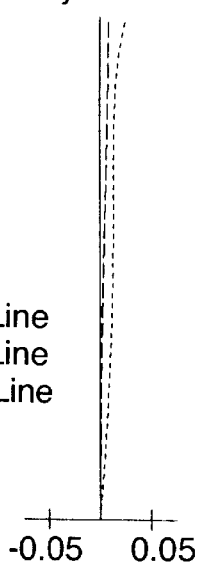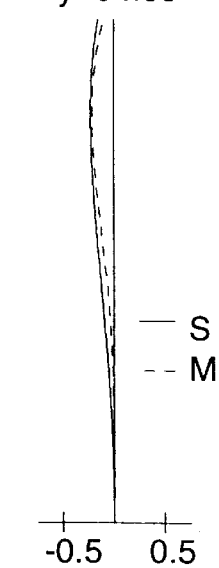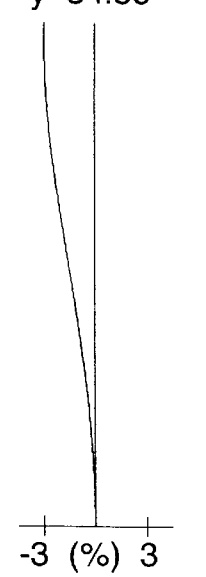
Fig.7A Fno=3.65 SPHERICAL ABERRATION CHROMATIC ABERRATION
Fig.7B y=34.85 LATERAL CHROMATIC ABERRATION
Fig.7C y=34.85 ASTIGMATISM
Fig.7D y=34.85 DISTORTION
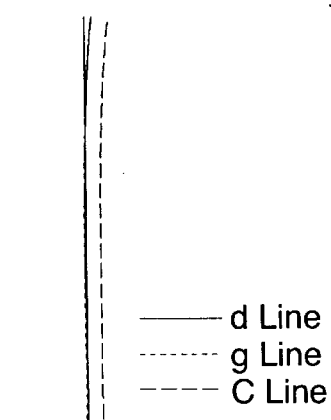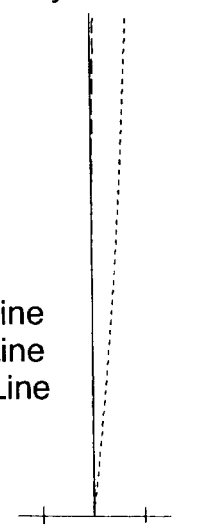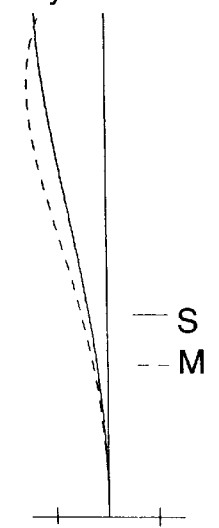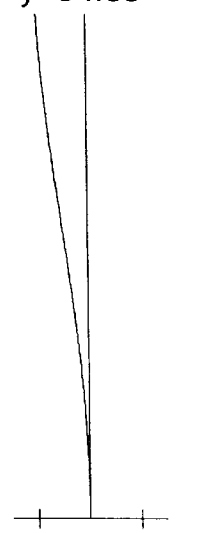
Fig.8A Fno=4.0 SPHERICAL ABERRATION CHROMATIC ABERRATION
Fig.8B y=34.85 LATERAL CHROMATIC ABERRATION
Fig.8C y=34.85 ASTIGMATISM
Fig.8D y=34.85 DISTORTION

Fig. 9
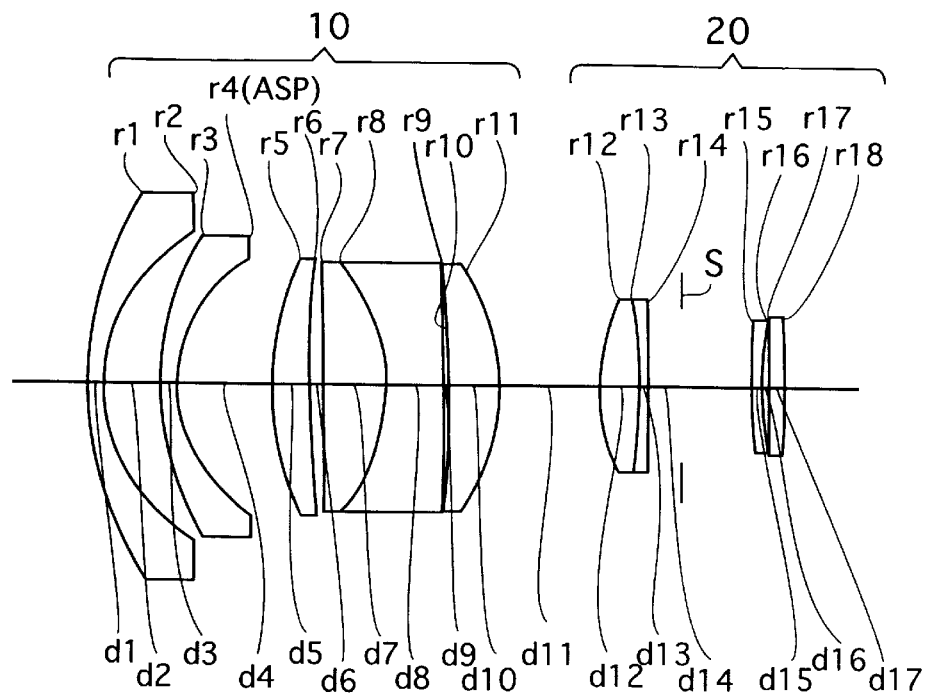
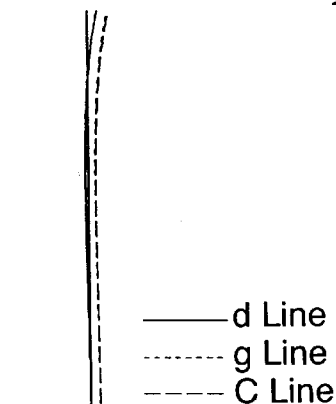
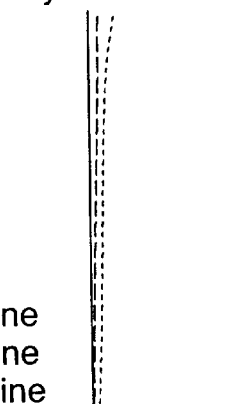
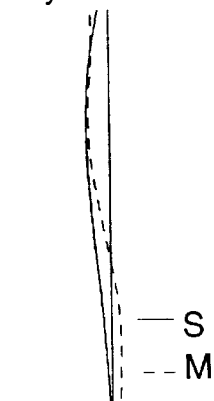
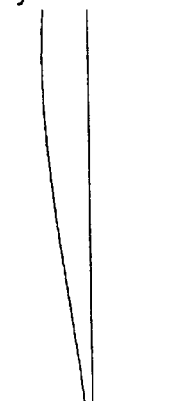
Fig.10A  Fig.10B  Fig.10C  Fig.10D
Fno=3.6  y=34.85  y=34.85  y=34.85
——— d Line
------ g Line
- - - C Line
— S
-- M
-0.5  0.5        -0.05  0.05      -0.5  0.5        -3 (%) 3
SPHERICAL        LATERAL           ASTIGMATISM      DISTORTION
ABERRATION       CHROMATIC
                 ABERRATION
CHROMATIC
ABERRATION

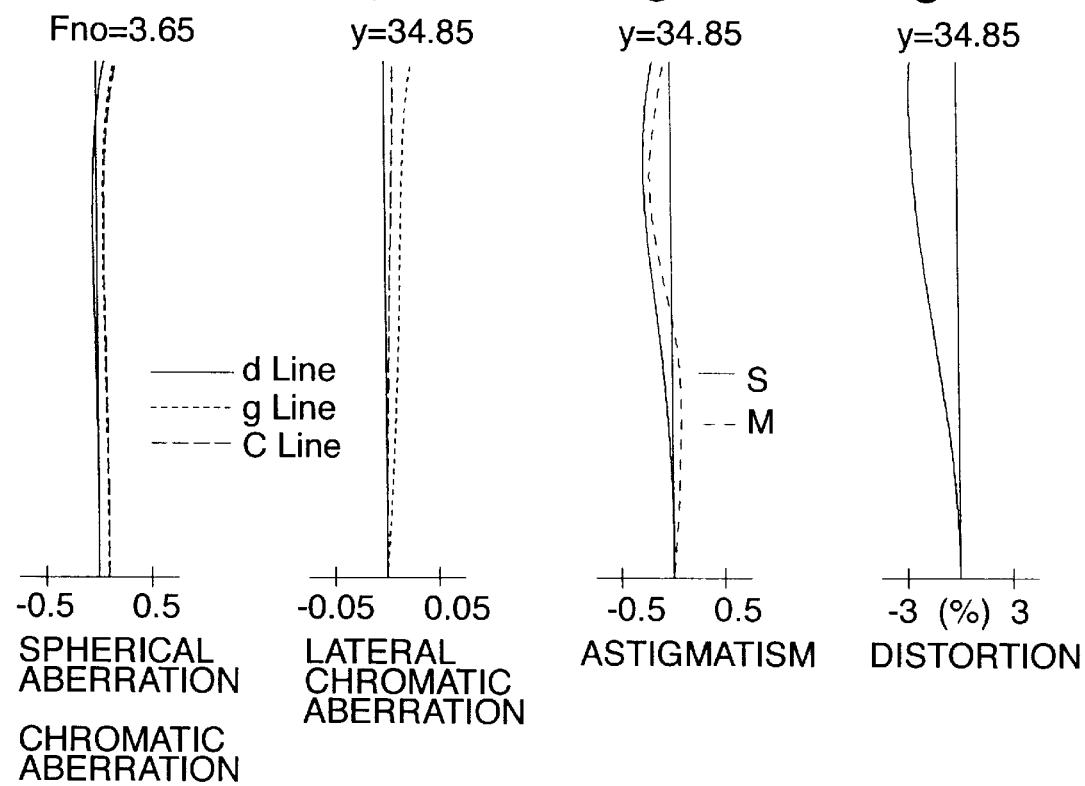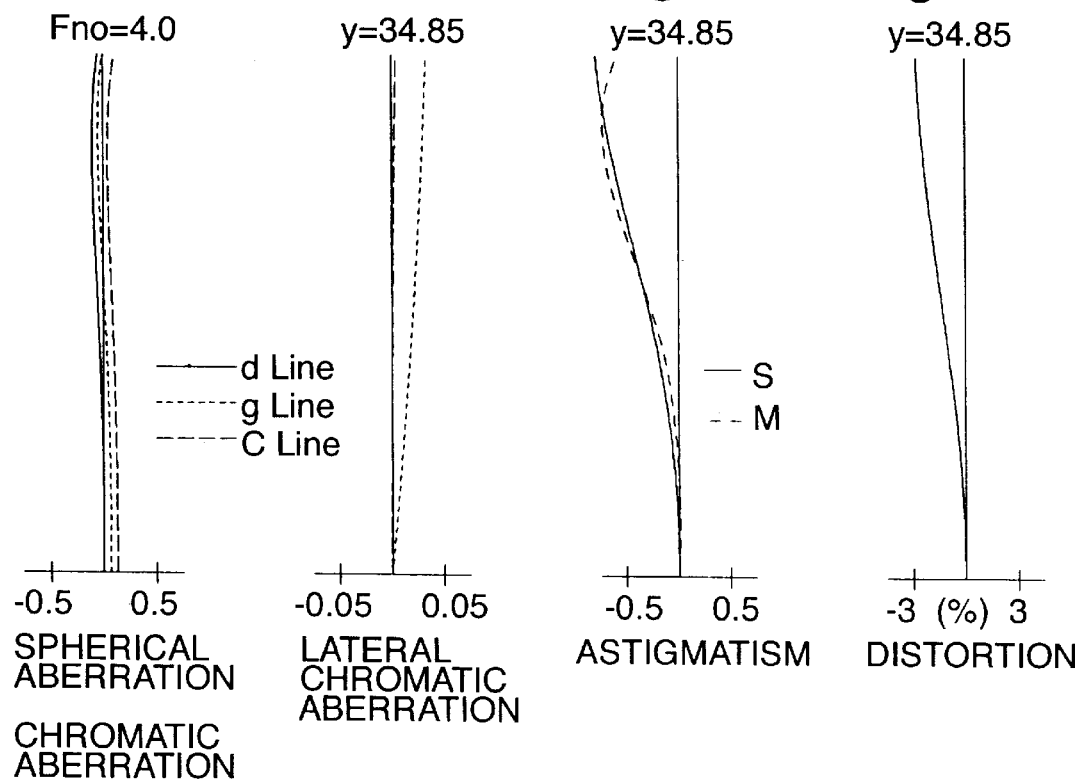

Fig. 13
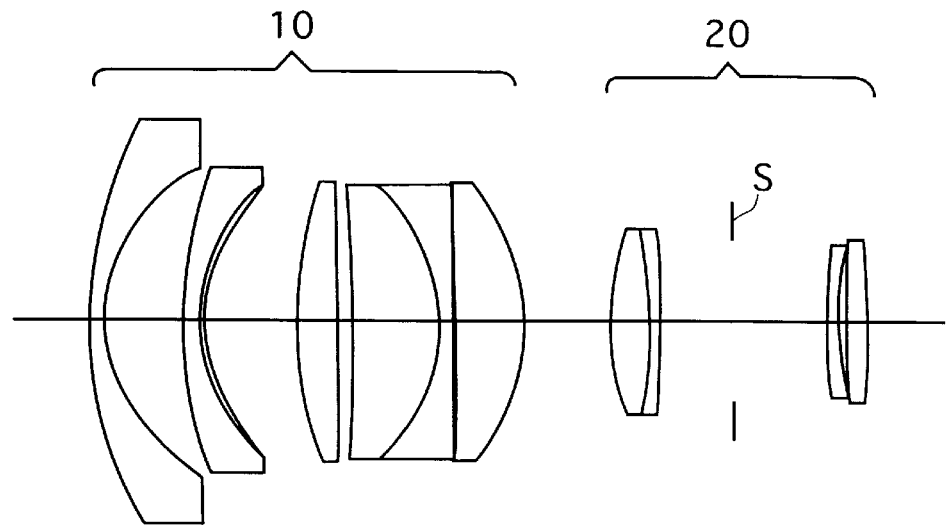
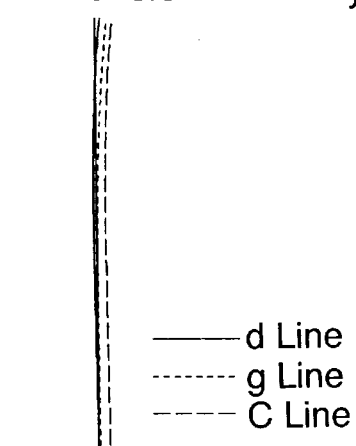
Fig.14A
Fno=3.6
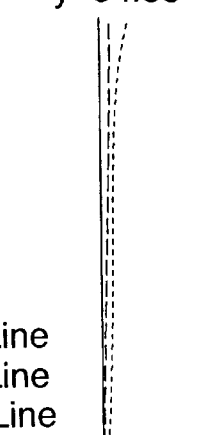
Fig.14B
y=34.85
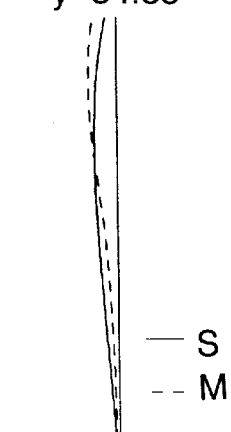
Fig.14C
y=34.85
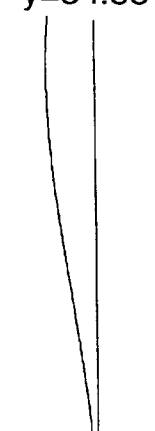
Fig.14D
y=34.85
—— d Line
------- g Line
--- C Line
—— S
--- M
-0.5  0.5
SPHERICAL
ABERRATION
CHROMATIC
ABERRATION
-0.05  0.05
LATERAL
CHROMATIC
ABERRATION
-0.5  0.5
ASTIGMATISM
-3 (%) 3
DISTORTION

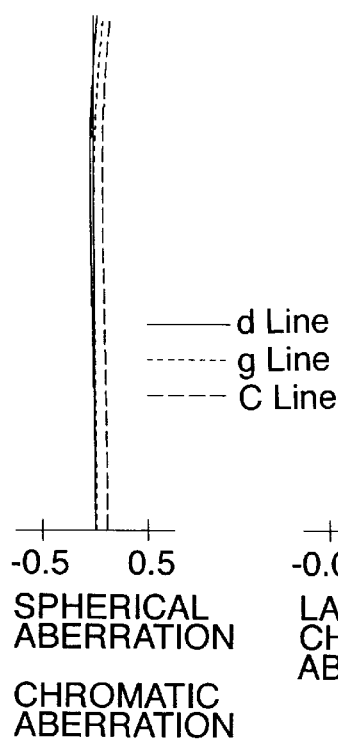
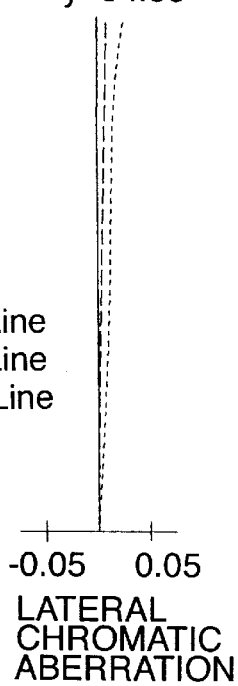
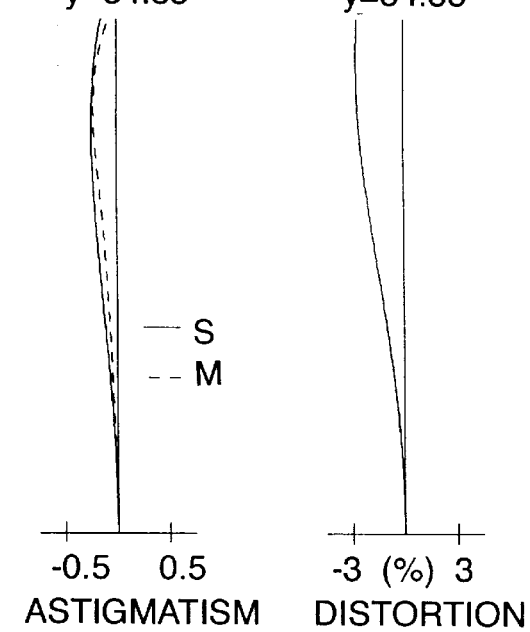
Fig. 15A  Fig. 15B  Fig. 15C  Fig. 15D
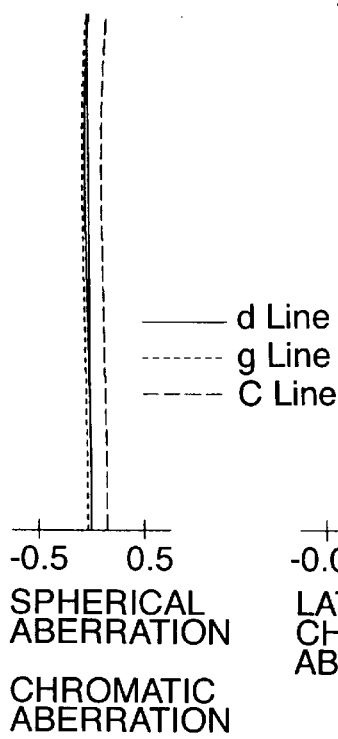
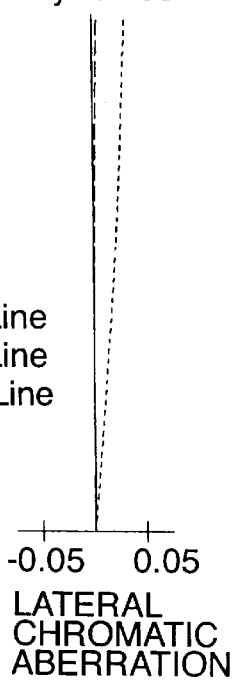
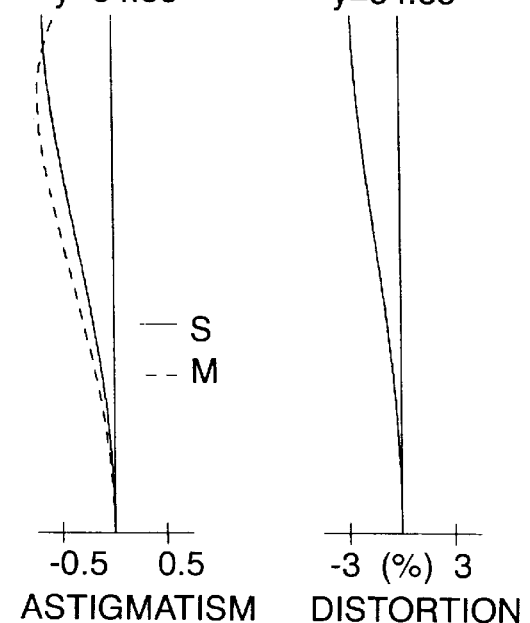
Fig. 16A  Fig. 16B  Fig. 16C  Fig. 16D

WIDE-ANGLE LENS SYSTEM

BACKGROUND OF THE INVENTION

1. Field of the Invention

The present invention relates to a wide-angle lens system to be utilized in a single lens reflex (SLR) camera.

2. Description of the Related Art

In a single lens reflex (SLR) camera, since a mirror is provided between the photographing lens system and the image forming plane, there is a need to provide a back focal distance of a predetermined length to place the mirror therebetween. Accordingly, in a wide-angle lens system, a retrofocus lens system in which a back focal distance is longer than the focal length of the lens system has been generally employed. A retrofocus lens system is constituted by a negative first lens group and a positive second lens group, in this order from the object. Since the refractive power (hereinafter, power) distribution is non-symmetrical with respect to the diaphragm, spherical aberration, coma, distortion, astigmatism and the like tend to become large. In order to correct these aberrations, the number of lens elements has to be increased. However, in a retrofocus lens system, the entire lens system is arranged to be advanced along the optical axis in order to perform focusing. Therefore if the number of lens elements are increased, the weight of the lens groups to be moved is increased, which is undesirable for autofocusing. In particular, this problem has to be considered in a wide-angle lens system for medium and large sized cameras in which a brownie film is loaded.

Accordingly, if an attempt is made to materialize a camera with an autofocusing function, it is preferable to employ a lens system in which a part of the lens system is made moveable. Amongst such lens systems, a rear-focusing type lens system is preferable, since the entire length thereof is constant, and is easy to be handled. However, compared with a lens system in which the entire lens system is advanced, a rear-focusing type lens system has caused large fluctuations of aberrations upon focusing. This tendency is, in particular, noticeable in a retrofocus lens system.

SUMMARY OF THE INVENTION

It is an object of the present invention to provide a rear-focusing wide-angle lens system of a retrofocus type, which has high image-forming performance at most of photographing distances, and has a half angle-of-view of about 44° and F-number of about 3.5.

In order to achieve the above-mentioned objects, there is provided a wide-angle lens system including a negative first lens group and a positive second lens group with a diaphragm, in this order from an object. Upon focusing, the positive second lens group is arranged to be moved along the optical axis. The wide-angle lens system satisfies the following conditions:

$$0.5 < TL2/f < 1.0 \quad (1)$$

$$-4 < f1/f2 < -2 \quad (2)$$

wherein

TL2 designates the distance, in the second lens group, between the most object-side surface of the most object-side lens element and the most image-side surface of the most image-side lens element;

f designates the focal length of the entire lens system when an object at an infinite distance is in an in-focus state;

f1 designates the focal length of the first lens group; and f2 designates the focal length of the second lens group.

The wide-angle lens system according to the present invention preferably satisfies the following condition:

$$-6 < f1/f < -3 \quad (3)$$

Furthermore, the wide-angle lens system according to the present invention can satisfy the following condition:

$$1.3 < TL1/TL2 < 2.8 \quad (4)$$

wherein

TL1 designates the distance, in the first lens group, between the most object-side surface of the most object-side lens element and the most image-side surface of the most image-side lens element.

Still further, it is preferable to provide cemented lens elements in which the convex cemented surface faces towards the image, and the cemented surface satisfies the following condition:

$$0.2 < (n1-n2) \cdot f/Rc < 1.0 \quad (5)$$

wherein n1 designates the refractive index of the object-side lens element with respect to the cemented surface; and n2 designates the refractive index of the image-side lens element with respect to the cemented surface; and Rc designates the radius of curvature of the cemented surface provided in the first lens group.

The present disclosure relates to subject matter contained in Japanese Patent Application No. Hei-11-354772 (filed on Dec. 14, 1999) which is expressly incorporated herein by reference in its entirety.

BRIEF DESCRIPTION OF THE DRAWINGS

The invention will be discussed below in detail with reference to the accompanying drawings, in which:

FIGS. 3A, 3B, 3C and 3D show various aberrations occurred in the lens arrangement shown in FIG. 1, when an object at a finite distance is in an in-focus state (x −1/40);

FIGS. 4A, 4B, 4C and 4D show various aberrations occurred in the lens arrangement shown in FIG. 1, when an object at the minimum photographing distance is in an in-focus state (x−1/5);

FIGS. 7A, 7B, 7C and 7D show various aberrations occurred in the lens arrangement shown in FIG. 5, when an object at a finite distance is in an in-focus state (x −1/40);

FIGS. 8A, 8B, 8C and 8D show various aberrations occurred in the lens arrangement shown in FIG. 5, when an object at the minimum photographing distance is in an in-focus state (x−1/5);

FIG. 9 is a lens arrangement of a wide-angle lens system when an object at an infinite distance is in an in-focus state, according to a third embodiment of the present invention;

FIGS. 10A, 10B, 10C and 10D show various aberrations occurred in the lens arrangement shown in FIG. 9;

FIGS. 11A, 11B, 11C and 11D show various aberrations occurred in the lens arrangement shown in FIG. 9, when an object at a finite distance is in an in-focus state (x−1/40);

FIGS. 12A, 12B, 12C and 12D show various aberrations occurred in the lens arrangement shown in FIG. 9, when an object at the minimum photographing distance is in an in-focus state (x−1/5);

FIG. 13 is a lens arrangement of a wide-angle lens system when an object at an infinite distance is in an in-focus state, according to a fourth embodiment of the present invention;

FIGS. 14A, 14B, 14C and 14D show various aberrations occurred in the lens arrangement shown in FIG. 13;

FIGS. 15A, 15B, 15C and 15D show various aberrations occurred in the lens arrangement shown in FIG. 13, when an object at a finite distance is in an in-focus state (x−1/40); and FIGS. 16A, 16B, 16C and 16D show various aberrations occurred in the lens arrangement shown in FIG. 13, when an object at the minimum photographing distance is in an in-focus state (x−1/5).

DESCRIPTION OF THE PREFERRED EMBODIMENTS

Figure 1:
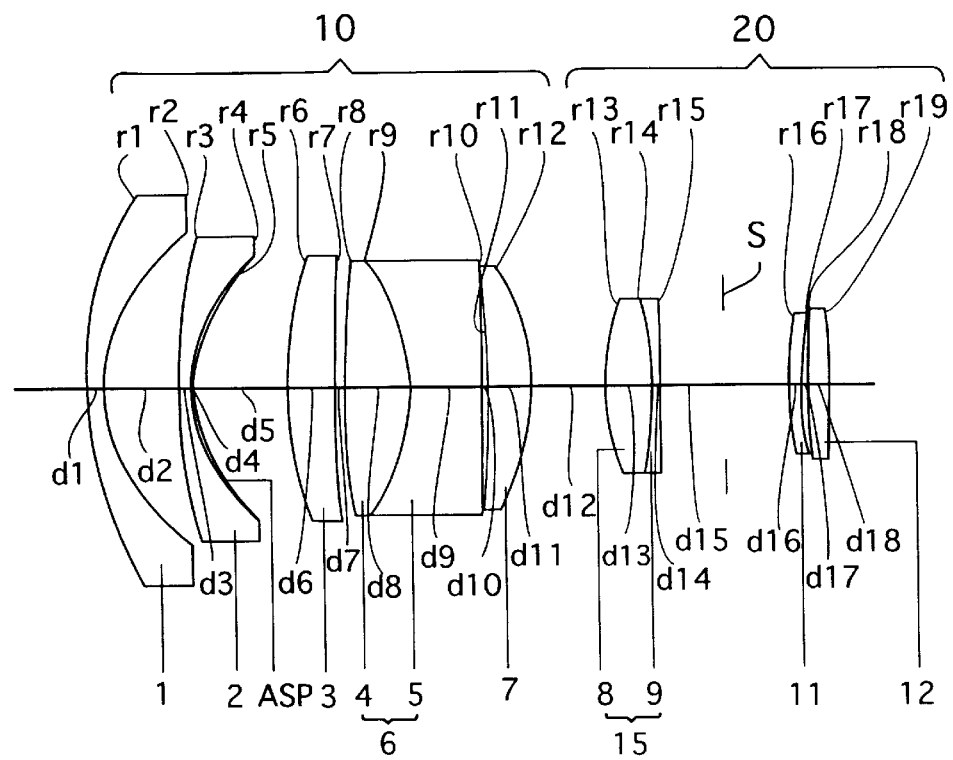
FIG. 1 is a lens arrangement of a wide-angle lens system when an object at an infinite distance is in an in-focus state, according to a first embodiment of the present invention.
Figure 2A:
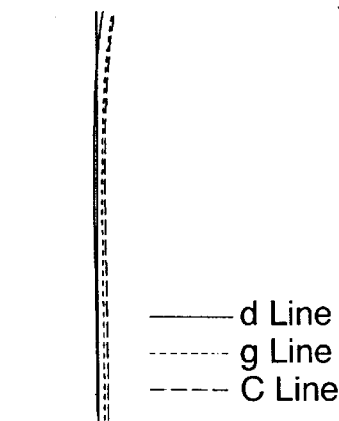
FIGS. 2A, 2B, 2C and 2D show various aberrations occurred in the lens arrangement shown in FIG. 1.
Figure 2B:
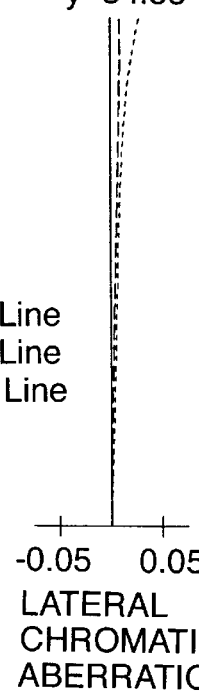
Figure 2C:
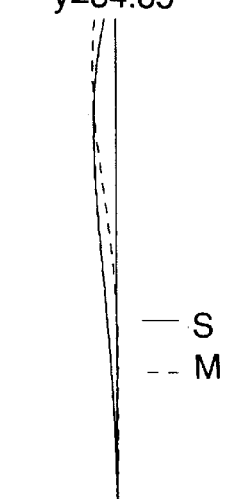
Figure 2D:
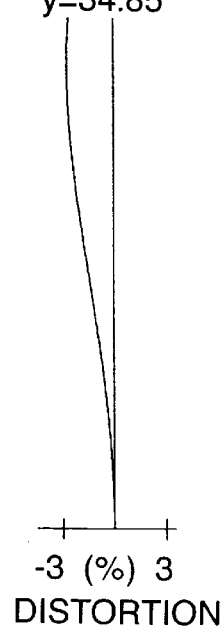

A wide-angle lens system which will be explained is a rear-focusing wide-angle lens system of a retrofocus type. As shown in FIGS. 1, 5, 9 and 13, the lens system includes a negative first lens group 10 and a positive second lens group 20 with a diaphragm S, in this order from the object. Upon focusing, the second lens group 20 is made moveable, and the diaphragm S is provided in the second lens group 20.

Condition (1) specifies the overall length (distance along the optical axis) of the second lens group 20. By satisfying this condition, the weight of a lens group to be used for focusing can be reduced, and various aberrations can satisfactorily be reduced.

If the overall length of the second lens group 20 becomes too long to the extent that TL2/f exceeds the upper limit of condition (1), not only the weight of the second lens group 20, but also the weight of the lens frame thereof has to be made heavier.

If the overall length of the second lens group 20 becomes too short to the extent that TL2/f exceeds the lower limit of condition (1), the correcting of aberrations, in particular, coma and lateral chromatic aberration, by the second lens group 20 alone cannot sufficiently be made.

Condition (2) specifies the balance of power over the first and second lens groups.

If the power of the first lens group 10 becomes too strong to the extent that f1/f2 exceeds the upper limit of condition (2), the diameter of the first lens group 10 can be made small; however, coma, field curvature, astigmatism become worse.

If the power of the second lens group 20 becomes too strong to the extent that f1/f2 exceeds the lower limit of condition (2), (i) the diameter of the first lens group 10 becomes large, (ii) spheircal aberration becomes worse, and (iii) the back focal-distance cannot be sufficiently maintained.

Condition (3) specifies the power of the first lens group 10.

If the power of the first lens group 10 becomes strong to the extent that f1/f exceeds the upper limit of condition (3), coma, astigmatism and distortion become worse, and the fluctuations of field curvature upon focusing becomes too large.

If the power of the first lens group 10 becomes too weak to the extent that f1/f exceeds the lower limit of condition (3), the back focal distance cannot be sufficiently maintained.

Condition (4) specifies the ratio of the overall length of the first lens group 10 to that of the second lens group 20.

If the overall length of the first lens group 10 is too long with respect to that of the second lens group 20 to the extent that TL1/TL2 exceeds the upper limit of condition (4), the first lens group 10 becomes distant from the diaphragm S in the second lens group 20, so that the diameter of the first lens group 10 becomes large though astigmatism and distortion can be sufficiently corrected.

If the overall length of the first lens group 10 becomes too short to the extent that that TL1/TL2 exceeds the lower limit of condition (4), the diameter of the first lens group 10 becomes small; however, various aberrations are made worse, and the back focal distance cannot be sufficiently maintained.

Condition (5) specifies the power of the cemented surface of the cemented lens elements in the case where the cemented lens elements are provided in the first lens group 10.

If the power of the cemented surface becomes strong to the extent that $(n1-n2) \cdot f/Rc$ exceeds the upper limit of condition (5), the power of the first lens group 10 can be increased and the overall length of the first lens group 10 can be made short; however, according to an increase of an angle of deviation, aberrations of higher order tend to be occurred due to mutual elimination of large aberrations.

If the power of the cemented surface becomes weak to the extent that $(n1-n2) \cdot f/Rc$ exceeds the lower limit of condition (5), aberrations can be sufficiently reduced; however, the overall length of the first lens group 10 becomes long, which causes an insufficient traveling distance of the second lens group 20 and an insufficient back focal distance.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinates. S designates the sagittal image, and M designates the meridional image. y designates an image height. In the tables, Fno designates the F-number, f designates the focal length of the entire lens system, m designates the transverse magnification, w designates the half angle-of-view (°), fB designates the back focal distance, r designates the radius of curvature, d designates the lens-element thickness or distance between lens elements, Nd designates the refractive index at the d-line, and v designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}\ldots$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIG. 1 is a lens arrangement of a wide-angle lens system, when an object at an infinite distance is photographed, according to the first embodiment. FIGS. 2A through 2D show various aberrations occurred in the lens arrangement shown in FIG. 1. FIGS. 3A through 3D show various aberrations occurred in the lens arrangement shown in FIG. 1, when an object at a finite distance is in an in-focus state (x–1/40). FIGS. 4A through 4D show various aberrations occurred in the lens arrangement shown in FIG. 1, when an object at the minimum photographing distance is in an in-focus state (x–1/5). Table 1 shows the numerical data of the first embodiment. The first lens group 10 includes a negative meniscus lens element 1, a negative meniscus lens element 2, a positive lens element 3, cemented lens elements 6 constituted by a positive lens element 4 and a negative lens element 5, and a positive lens element 7, in this order from the object. The second lens group 20 includes cemented lens elements 15 constituted by a positive lens element 8 and a negative lens element 9, a negative lens element 11, and a positive lens element 12, in this order from the object. In the second lens group 20, a diaphragm S is provided on the image side with respect to the cemented lens elements. Furthermore, in the first lens group 10, an aspherical surface ASP is formed on the image-side surface of the negative meniscus lens element 2, and the aspherical surface is made of synthetic resin which is provided, as a layer, on the image-side surface of the negative meniscus lens element 2 which is made of glass.

TABLE 1

|  | Infinity | x –1/40 | x –1/5(minimum distance) |
|---|---|---|---|
| $F_{NO} = 1$: | 3.6 | 3.65 | 4.0 |
| f = | 36.00 | 36.08 | 36.70 |
| m = | 0.000 | –0.025 | –0.200 |
| $F_B$ = | 57.80 | 58.73 | 65.39 |
| W = 44.8 | | | |

| Surface No. | r | d | $N_d$ | ν |
|---|---|---|---|---|
| 1 | 53.124 | 2.400 | 1.77250 | 49.6 |
| 2 | 25.971 | 9.762 | — | — |
| 3 | 78.250 | 2.000 | 1.72916 | 54.7 |
| 4 | 23.763 | 0.200 | 1.52700 | 43.7 |
| 5* | 20.145 | 12.571 | — | — |
| 6 | 54.893 | 6.437 | 1.74000 | 28.3 |
| 7 | 210.588 | 1.372 | — | — |
| 8 | 132.266 | 8.948 | 1.53172 | 48.9 |
| 9 | –28.702 | 9.996 | 1.80400 | 46.6 |
| 10 | –564.709 | 0.472 | — | — |
| 11 | –201.092 | 6.024 | 1.51454 | 54.7 |
| 12 | –33.441 | 10.110–9.178–2.522 | — | — |
| 13 | 31.710 | 6.342 | 1.48749 | 70.2 |
| 14 | –78.830 | 1.480 | 1.84666 | 23.8 |
| 15 | –250.813 | 8.802 | — | — |
| Diaphragm | ∞ | 9.067 | — | — |
| 16 | 85.034 | 1.300 | 1.84666 | 23.8 |
| 17 | 42.504 | 1.143 | — | — |
| 18 | 162.143 | 2.861 | 1.58636 | 60.9 |
| 19* | –97.132 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | –1.00 | $0.4304 \times 10^{-5}$ | $-0.2134 \times 10^{-5}$ | $-0.3556 \times 10^{-11}$ |
| 19 | 0.00 | $0.9007 \times 10^{-5}$ | $0.8322 \times 10^{-5}$ | $0.5314 \times 10^{-10}$ |

[Embodiment 2]

Figures 5, 6A, 6B, 6C, 6D:
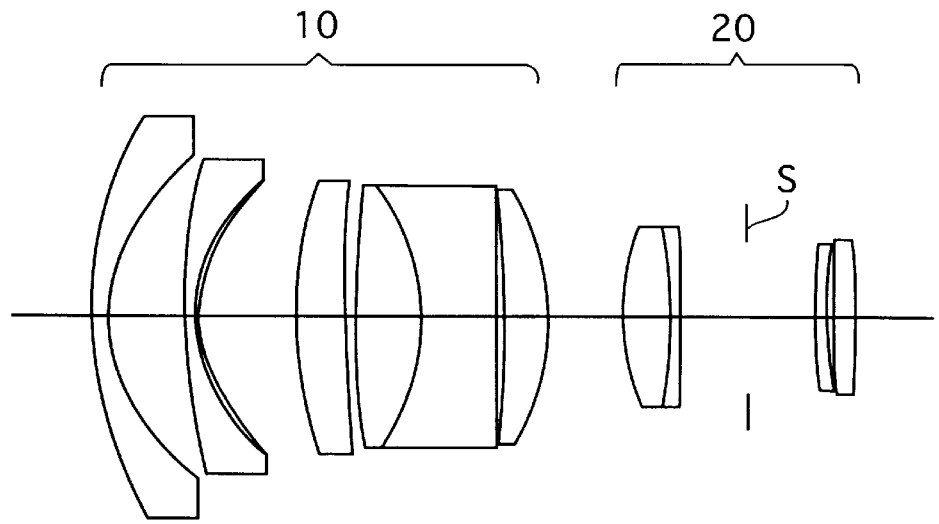
FIG. 5 is a lens arrangement of a wide-angle lens system when an object at an infinite distance is in an in-focus state, according to a second embodiment of the present invention.
FIGS. 6A, 6B, 6C and 6D show various aberrations occurred in the lens arrangement shown in FIG. 5.

FIG. 5 is a lens arrangement of a wide-angle lens system, when an object at an infinite distance is photographed, according to the second embodiment. FIGS. 6A through 6D show various aberrations occurred in the lens arrangement shown in FIG. 5. FIGS. 7A through 7D show various aberrations occurred in the lens arrangement shown in FIG. 5, when an object at a finite distance is in an in-focus state (x–1/40). FIGS. 8A through 8D show various aberrations occurred in the lens arrangement shown in FIG. 5, when an object at the minimum photographing distance is in an in-focus state (x–1/5). Table 2 shows the numerical data of the second embodiment. The basic lens arrangement of the second embodiment is the same as the first embodiment.

TABLE 2

|  | Infinity | x –1/40 | x –1/5(minimum distance) |
|---|---|---|---|
| $F_{NO} = 1$: | 3.6 | 3.65 | 4.0 |
| f = | 36.00 | 36.13 | 37.11 |
| m = | 0.000 | –0.025 | –0.200 |
| $f_B$ = | 57.80 | 58.77 | 65.77 |
| W = 44.8 | | | |

| Surface No. | r | d | $N_d$ | ν |
|---|---|---|---|---|
| 1 | 55.872 | 2.200 | 1.77250 | 49.6 |
| 2 | 22.752 | 9.124 | — | — |
| 3 | 49.667 | 2.000 | 1.72916 | 54.7 |
| 4 | 24.420 | 0.400 | 1.52700 | 43.7 |
| 5* | 20.123 | 12.359 | — | — |
| 6 | 55.753 | 5.617 | 1.75520 | 27.5 |
| 7 | –451.787 | 1.938 | — | — |
| 8 | –109.206 | 9.637 | 1.51454 | 54.7 |
| 9 | –23.786 | 1.529 | 1.80400 | 46.6 |
| 10 | –288.733 | 0.612 | — | — |
| 11 | –219.543 | 8.696 | 1.51823 | 59.0 |
| 12 | –29.006 | 11.587–10.619–3.613 | — | — |
| 13 | 36.089 | 7.000 | 1.48749 | 70.2 |
| 14 | –61.299 | 1.500 | 1.84666 | 23.8 |
| 15 | –129.668 | 8.939 | — | — |
| Diaphragm | ∞ | 13.270 | — | — |
| 16 | 209.027 | 1.300 | 1.80518 | 25.4 |
| 17 | 55.163 | 0.571 | — | — |
| 18 | 115.405 | 2.920 | 1.58636 | 60.9 |
| 19* | –88.669 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 | A10 |
|---|---|---|---|---|---|
| 5 | –1.00 | $0.2629 \times 10^{-5}$ | $-0.6085 \times 10^{-8}$ | $-0.5376 \times 10^{-11}$ | $-0.1712 \times 10^{-13}$ |
| 19 | 0.00 | $0.7477 \times 10^{-5}$ | $0.8373 \times 10^{-8}$ | $0.2271 \times 10^{-10}$ | — |

[Embodiment 3]

FIG. 9 is a lens arrangement of a wide-angle lens system, when an object at an infinite distance is photographed, according to the third embodiment. FIGS. 10A through 10D show various aberrations occurred in the lens arrangement shown in FIG. 9. FIGS. 11A through 11D show various aberrations occurred in the lens arrangement shown in FIG. 9, when an object at a finite distance is in an in-focus state (x–1/40). FIGS. 12A through 12D show various aberrations occurred in the lens arrangement shown in FIG. 9, when an object at the minimum photographing distance is in an in-focus state (x–1/5). Table 3 shows the numerical data of the third embodiment. The basic lens arrangement of the third embodiment is the same as the first embodiment except that the aspherical surface on the image-side surface of the image-side negative meniscus lens element in the first lens group 10 is formed by the aspherical-surface machining process.

TABLE 3

| | Infinity | x −1/40 | x −1/5(minimum distance) | |
|---|---|---|---|---|
| $F_{NO}$ = 1: | 3.6 | 3.65 | 4.0 | |
| f = | 36.00 | 36.11 | 36.91 | |
| m = | 0.000 | −0.025 | −0.200 | |
| $f_B$ = | 57.80 | 58.75 | 65.54 | |
| W = 44.8 | | | | |
| Surface No. | r | d | $N_d$ | ν |
| 1 | 49.118 | 2.000 | 1.77250 | 49.6 |
| 2 | 24.260 | 7.882 | — | — |
| 3 | 40.987 | 2.000 | 1.72916 | 54.7 |
| 4* | 18.147 | 12.696 | — | — |
| 5 | 40.861 | 5.059 | 1.72151 | 29.2 |
| 6 | 145.859 | 2.047 | — | — |
| 7 | −668.374 | 8.442 | 1.54072 | 47.2 |
| 8 | −25.603 | 7.888 | 1.83481 | 42.7 |
| 9 | −378.567 | 0.605 | — | — |
| 10 | −161.531 | 6.750 | 1.51742 | 52.4 |
| 11 | −29.941 | 13.534–12.588–5.792 | — | — |
| 12 | 27.219 | 5.466 | 1.48749 | 70.2 |
| 13 | −80.640 | 1.300 | 1.84666 | 23.8 |
| 14 | −260.582 | 4.365 | — | — |
| Diaphragm | ∞ | 9.486 | — | — |
| 15 | 76.988 | 1.300 | 1.84666 | 23.8 |
| 16 | 40.749 | 0.881 | — | — |
| 17 | 193.449 | 2.203 | 1.58636 | 60.9 |
| 18* | 148.734 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 4 | −1.00 | $0.1186 \times 10^{-4}$ | $0.4108 \times 10^{-8}$ | $0.9616 \times 10^{-11}$ |
| 18 | 0.00 | $0.1320 \times 10^{-4}$ | $0.1544 \times 10^{-7}$ | $0.9317 \times 10^{-10}$ |

[Embodiment 4]

FIG. 13 is a lens arrangement of a wide-angle lens system, when an object at an infinite distance is photographed, according to the fourth embodiment. FIGS. 14A through 14D show various aberrations occurred in the lens arrangement shown in FIG. 13. FIGS. 15A through 15D show various aberrations occurred in the lens arrangement shown in FIG. 13, when an object at a finite distance is in an in-focus state (x–1/40). FIGS. 16A through 16D show various aberrations occurred in the lens arrangement shown in FIG. 13, when an object at the minimum photographing distance is in an in-focus state (x –1/5). Table 4 shows the numerical data of the fourth embodiment. The basic lens arrangement of the fourth embodiment is the same as the first embodiment.

TABLE 4

| | Infinity | x-1/40 | x-1/5 (minimum distance) | |
|---|---|---|---|---|
| $F_{NO}$ = 1: | 3.6 | 3.65 | 4.0 | |
| f = | 36.00 | 36.11 | 36.94 | |
| m = | 0.000 | −0.025 | −0.200 | |
| $f_B$ = | 57.80 | 58.75 | 65.61 | |
| W = 44.8 | | | | |
| Surface No. | r | d | $N_d$ | ν |
| 1 | 53.064 | 2.200 | 1.77250 | 49.6 |
| 2 | 23.194 | 10.016 | — | — |
| 3 | 59.563 | 2.000 | 1.72916 | 54.7 |
| 4 | 24.124 | 0.400 | 1.52700 | 43.7 |
| 5* | 20.300 | 12.107 | — | — |
| 6 | 53.743 | 5.485 | 1.75520 | 27.5 |
| 7 | −1193.312 | 2.137 | — | — |
| 8 | −192.777 | 11.000 | 1.51742 | 52.4 |
| 9 | −24.211 | 2.000 | 1.80400 | 46.6 |
| 10 | −760.091 | 0.165 | — | — |
| 11 | −440.523 | 8.739 | 1.51823 | 59.0 |
| 12 | −29.120 | 11.274 – 10.321 – 3.464 | — | — |
| 13 | 35.438 | 5.240 | 1.48749 | 70.2 |
| 14 | −61.231 | 1.500 | 1.84666 | 23.8 |
| 15 | −132.245 | 9.424 | — | — |
| Diaphragm | ∞ | 12.318 | — | — |
| 16 | 97.265 | 1.492 | 1.84666 | 23.8 |
| 17 | 47.378 | 0.949 | — | — |
| 18 | 182.535 | 2.752 | 1.58636 | 60.9 |
| 19* | −97.141 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 5 | −1.00 | $0.3060 \times 10^{-5}$ | $0.2868 \times 10^{-8}$ | $-0.1268 \times 10^{-10}$ |
| 19 | 0.00 | $0.7658 \times 10^{-5}$ | $0.9964 \times 10^{-8}$ | $0.2314 \times 10^{-10}$ |

| Surf. No. | A10 |
|---|---|
| 5 | $0.4817 \times 10^{-15}$ |
| 19 | — |

Table 5 shows the numerical values of each condition for each embodiment.

TABLE 5

| | Embod. 1 | Embod. 2 | Embod. 3 | Embod. 4 |
|---|---|---|---|---|
| Cond. (1) | 0.861 | 0.986 | 0.694 | 0.935 |
| Cond. (2) | −2.807 | −2.020 | −2.521 | −2.233 |
| Cond. (3) | −5.574 | −3.862 | −4.695 | −4.360 |
| Cond. (4) | 1.942 | 1.524 | 2.215 | 1.670 |
| Cond. (5) | 0.342 | 0.438 | 0.414 | 0.426 |

As can be understood from Table 5, each condition of each embodiment has been satisfied, and as can be understood from the aberration diagrams, aberrations have been sufficiently corrected.

According to the above descriptions, a rear-focusing wide-angle lens system of a retrofocus type, which has high image-forming performance at most of photographing distances, and has a half angle of view of about 44° and F-number of about 3.5, can be obtained.

What is claimed is:

1. A fixed focal length wide-angle lens system consisting of a negative first lens group and a positive second lens group with a diaphragm, in this order from an object, wherein upon focusing, said positive second lens group is moved along the optical axis and said negative first lens group is fixed, and wherein said wide-angle lens system satisfies the following conditions:

$$0.5<TL2/f<1.0$$

$$-4<f1/f2<-2$$

wherein

TL2 designates the distance, in said second lens group, between the most object-side surface of the most object-side lens element and the most image-side surface of the most image-side lens element;

f designates the focal length of the entire lens system when an object at an infinite distance is in an in-focus state;

f1 designates the focal length of said first lens group; and f2 designates the focal length of said second lens group.

2. The wide-angle lens system according to claim 1, satisfies the following condition:

$$-6<f1/f<-3.$$

3. The wide-angle lens system according to claim 1, satisfies the following condition:

$$1.3<TL1/TL2<2.8$$

wherein

TL1 designates the distance, in said first lens group, between the most object-side surface of the most object-side lens element and the most image-side surface of the most image-side lens element.

4. The wide-angle lens system according to claim 1, wherein said first lens group comprises cemented lens elements having a convex cemented surface facing towards an image, and wherein said cemented surface satisfies the following condition:

$$0.2<(n1-n2)\cdot f/Rc<1.0$$

wherein n1 designates the refractive index of the object-side lens element with respect to said cemented surface;

n2 designates the refractive index of the image-side lens element with respect to said cemented surface; and Rc designates the radius of curvature of said cemented surface provided in said first lens group.

5. A fixed focal length wide-angle lens system comprising a negative first lens group and a positive second lens group with a diaphragm, in this order from an object, wherein upon focusing, said positive second lens group is moved along an optical axis, and wherein said wide-angle lens system satisfies the following conditions:

$$0.5<TL2/f<1.0$$

$$-4<f1/f2<-2$$

$$-6<f1/f<-3$$

wherein

TL2 designates the distance, in said second lens group, between the most object-side surface of the most object-side lens element and the most image-side surface of the most image-side lens element;

f designates the focal length of the entire lens system when an object at an infinite distance is in an in-focus state;

f1 designates the focal length of said first lens group; and f2 designates the focal length of said second lens group.

6. A wide-angle lens system comprising a negative first lens group and a positive second lens group with a diaphragm, in this order from an object, wherein upon focusing, said positive second lens group is moved along an optical axis, and wherein said wide-angle lens system satisfies the following conditions:

$$0.5<TL2/f<1.0$$

$$-4<f1/f2<-2$$

$$1.3<TL1/TL2<2.8$$

wherein

TL1 designates the distance, in said first lens group, between the most object-side surface of the most object-side lens element and the most image-side surface of the most image-side lens element;

TL2 designates the distance, in said second lens group, between the most object-side surface of the most object-side lens element and the most image-side surface of the most image-side lens element;

f designates the focal length of the entire lens system when an object at an infinite distance is in an in-focus state;

f1 designates the focal length of said first lens group; and f2 designates the focal length of said second lens group.

7. A wide-angle lens system comprising a negative first lens group and a positive second lens group with a diaphragm, in this order from an object, wherein upon focusing, said positive second lens group is moved along an optical axis, and wherein said wide-angle lens system satisfies the following conditions:

$$0.5<TL2/f<1.0$$

$$-4<f1/f2<-2$$

wherein

TL2 designates the distance, in said second lens group, between the most object-side surface of the most object-side lens element and the most image-side surface of the most image-side lens element;

f designates the focal length of the entire lens system when an object at an infinite distance is in an in-focus state;

f1 designates the focal length of said first lens group; and f2 designates the focal length of said second lens group; and wherein said first lens group comprises cemented lens element having a convex cemented surface facing towards an image, and wherein said cemented surface satisfies the following condition:

$$0.2 < (n_1 - n_2) \cdot f/Rc < 1.0$$

wherein n1 designates the refractive index of the object-side lens element with respect to said cemented surface;

n2 designates the refractive index of the image-side lens element with respect to said cemented surface; and Rc designates the radius of curvature of said cemented surface of said first lens group.

* * * * *